July 10, 1956  J. M. CUMMING  2,753,801
COMBINATION LIQUID AND SOLID PROPELLANT ROCKET
Filed Feb. 28, 1952  2 Sheets-Sheet 1

INVENTOR.
JAMES M. CUMMING
BY
Edward C. Walsh
G. D. O'Brien
ATTORNEYS

July 10, 1956  J. M. CUMMING  2,753,801
COMBINATION LIQUID AND SOLID PROPELLENT ROCKET
Filed Feb. 28, 1952  2 Sheets-Sheet 2
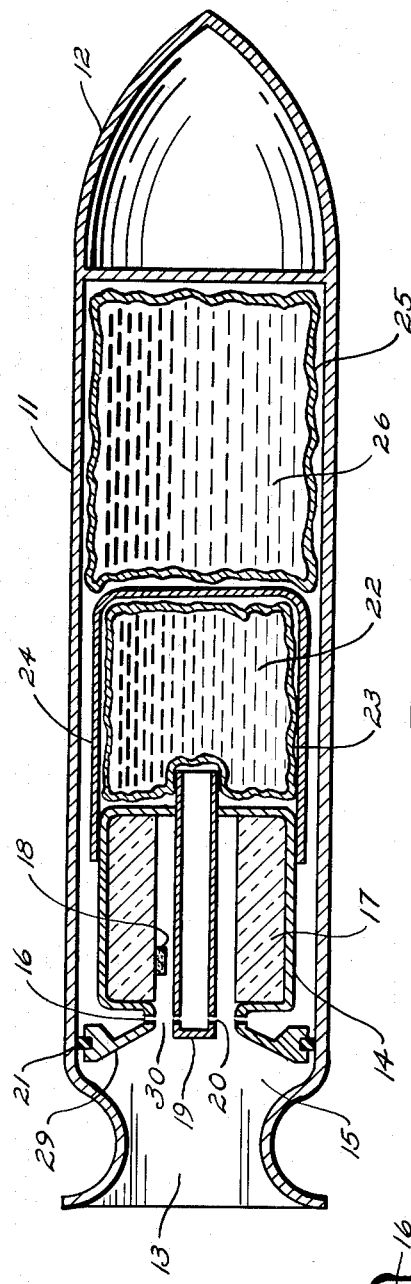
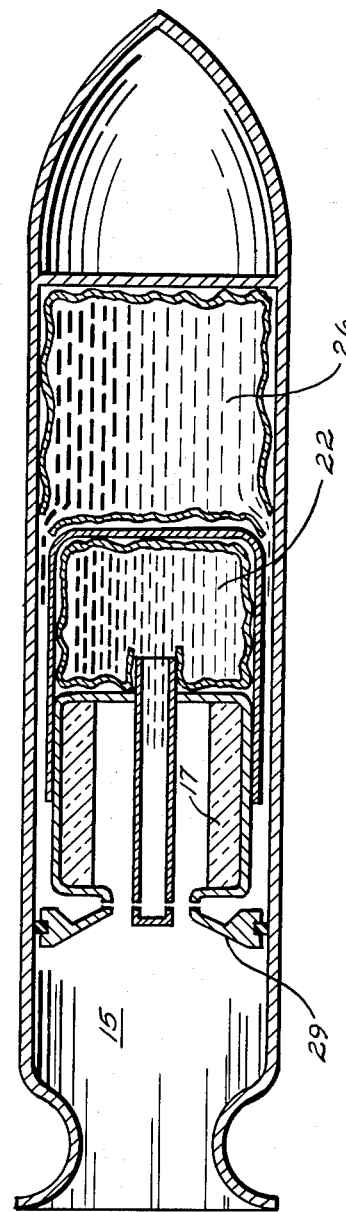
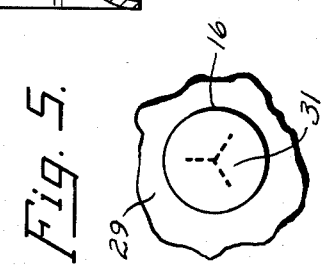
INVENTOR.
JAMES M. CUMMING
BY
Edward C. Walsh
J. O. O'Brien
ATTORNEYS _United States Patent Office_

2,753,801
Patented July 10, 1956

2,753,801
COMBINATION LIQUID AND SOLID PROPELLENT ROCKET

James M. Cumming, San Marino, Calif.

Application February 28, 1952, Serial No. 274,042

7 Claims. (Cl. 102—49)

(Granted under Title 35, U. S. Code (1952), sec. 266)

The invention described herein may be manufactured and used by or for the Government of the United States of America for governmental purposes without the payment of any royalties thereon or therefor.

The present invention relates to a rocket projectile and more particularly to a rocket projectile utilizing a solid propellant in conjunction with a liquid propellant to produce a highly efficient and simplified rocket.

In previously used methods the rocket projectiles have had the size of the combustion chamber held constant during the combustion process and they required a separate pressurizing system to force liquids through the injector. Some of these previously used methods are:

1. A turbo-pump system; the disadvantage being that it requires costly apparatus not suitable for use in a small liquid propellant round.
2. Use of volatile liquid propellant components which depend upon their own vapor pressure for expulsion; its disadvantage being that it requires very high stresses in tank walls and severely limits the choice of liquids for propellants.
3. Use of a gas pressurizing system which may consist of, (a) A gas generator using a solid propellant,
  (b) A gas generator using a liquid propellant, or
  (c) A gas stored at high pressure and admitted to the propellent tanks to force the liquids out through the injector. Although gas pressurizing systems have appeared to be favorable for small rockets, they require costly devices and limit the space available for the storage of liquids.

The present invention overcomes the above mentioned disadvantages by providing for a movable injector, the movement of which, enlarges the combustion chamber so as to obtain maximum combustion efficiency, and causes injection of the liquid propellant into the combustion chamber thereby eliminating a separate pressurizing or pumping system.

An object of the present invention is to provide a simplified type of combination liquid and solid propellent rocket suitable for mass production.

A further object of the invention is the provision of means to obtain maximum propellent loading of the rocket.

Still another object is to provide a combination liquid and solid propellent rocket with an expansible chamber so as to obtain maximum combustion efficiency.

Another object is to provide a simplified combination liquid and solid propellent rocket that eliminates the use of gases stored at high pressures to inject the liquid propellant into the combustion chamber.

A further object of the present invention is to provide a combination liquid and solid propellent rocket with a simplified injection system that does not require a separate pumping system.

A final objection of the present invention is to provide higher combustion efficiency through the injection of slightly heated propellent liquids into a gas stream having a high velocity and temperature.

Other objects and many of the attendant advantages of this invention will be readily appreciated as the same becomes better understood by reference to the following detailed description when considered in connection with the accompanying drawings in which:

Fig. 3 illustrates a sectional view, before ignition has occurred, of a modification of the present invention for use with a bipropellent system.

Fig. 4 is the same view as Fig. 3, during the combustion process.

Fig. 5 is a fragmentary view of the partition in the direction of arrow 5 in Fig. 1, and illustrates a typical burst diaphragm when used in place of the plastic bag containers.

Figure 1:
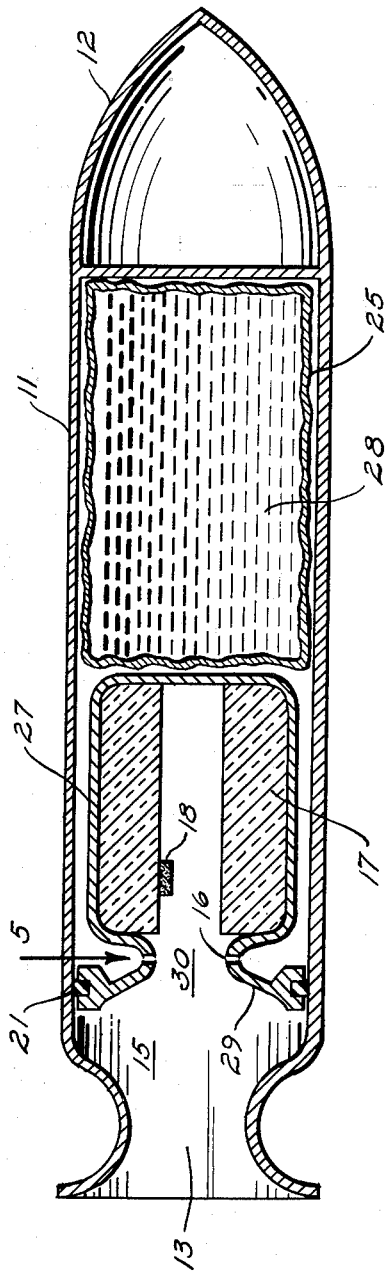
Fig. 1 shows a sectional view, before ignition has taken place, of a preferred embodiment of the present invention using a monopropellant.
Figure 2:
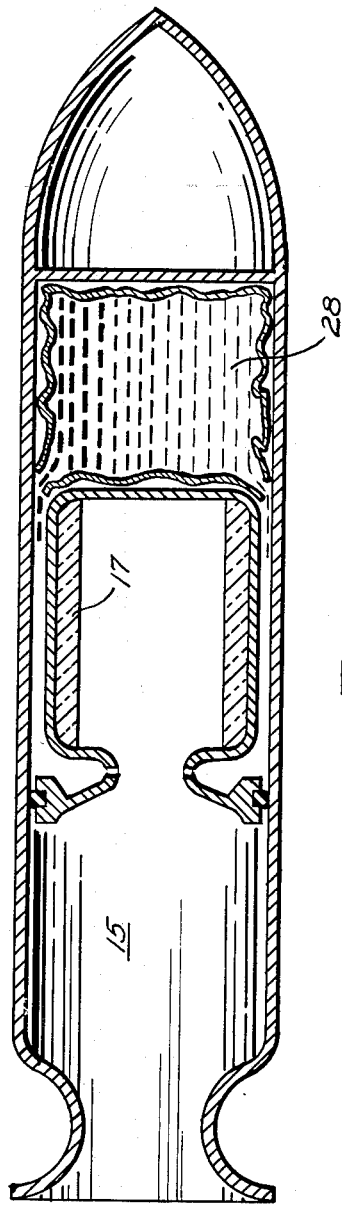
Fig. 2 shows the same view as Fig. 1, during the combustion process.

Referring now to the drawings, wherein like reference characters designate like or corresponding parts throughout the several views, there is shown in Figs. 1 and 2, a cylindrical body 11 having secured to its forward end a war-head 12 and provided with a rearwardly extending exhaust nozzle 13 through which the products of combustion are discharged. Having sliding engagement with the inner wall of said casing is a partition 29 provided with orifices 16 and an aperture 30, thereby forming a movable wall of a combustion chamber 15. Secured to the forward face of the partition is a solid propellent rocket motor 27 discharging through the aperture 30 and comprising a solid propellant 17 and an igniter 18. The partition is sealed by an O-ring 21. A rupturable bag 25, such as plastic or like bag, containing a liquid propellant 28 is located in the forward portion of the cylindrical body 11 between the rocket motor and the war-head. In place of the plastic bag 25 the propellant may be retained in the forward portion of the cylindrical body by using burst diaphragms 31, as shown in Fig. 5, to seal the orifices 16 until forward movement of the partition 29 produces the required pressure to burst them.

With the foregoing in mind and referring to Figs. 1 and 2, the operation of the device is as follows:

When the solid propellant 17 is started by the igniter 18, the resulting force moves the rocket motor 27 forward, thereby bursting the bag 25, or the orifice diaphragm seals, and forcing the liquid propellant 28 under pressure through the orifices 16 into the combustion chamber 15, where it is ignited. The combustion process in the chamber produces a flow of gases to provide the propelling force for the rocket.

Figs. 3 and 4 show a cylindrical body 11, having secured to its forward end a war-head 12 and provided with a rearwardly extending exhaust nozzle 13, through which the products of combustion are discharged. Having sliding engagement with the inner wall of said body is a partition 29 provided with orifices 16 and an aperture 30, thereby forming a movable wall of a combustion chamber 15. Secured to the forward face of the partition is a solid propellent rocket motor 14, comprising a solid propellant 17, an igniter 18, and a fuel feed tube and injector 19, which is fixed to the rocket motor at its open forward end, and is provided with injector orifices 20 at its aft end, discharging into said aperture. The partition is sealed by an O-ring 21.

A liquid propellant 22 is contained in a puncturable bag 23, such as a plastic or like bag, which is tied to the open forward end of the fuel feed pipe. A movable light weight fuel tank 24, such as light metal or plastic, telescopically closes over the rocket motor 14 and supports and compresses the bag containing the liquid propellant. A rupturable bag 25, containing an oxidant 26, is located in the forward portion of the body 11 between the light fuel tank and the war-head.

In operation, when the solid propellant 17 is ignited by the igniter 18, the resulting force moves the rocket motor 14 forward into the fuel tank 24, thereby puncturing the bag 23 with the fuel feed tube 19, and forcing the liquid propellant 22 into the combustion chamber 15, through the fuel feed tube 19, and the fuel feed tube orifices 20.

As the partition and rocket motor move forward continually compressing the liquid in the fuel tank, the fuel tank is also moved forward, thereby rupturing the oxidant bag 25, and forcing the oxidant into the annular space between the fuel tank and the cylindrical body, through the orifices 16, and into the combustion chamber 15, to be mixed with the fuel. The liquids are kept from mixing in the propellent tanks by the use of the fuel tank 24, which closes over the rocket motor 14 as the liquid oxidant from the aft bag 25 is being expelled through the orifices 16 into the combustion chamber. In place of the bag 23, the propellant may be retained in the fuel tank 24 by using a burst diaphragm similar to 31, as shown in Fig. 5, to seal the open forward end of the fuel feed tube 19 until the forward motion of the rocket motor 14 produces the required pressure to burst it. Likewise, bag 25 may be replaced by burst diaphragms to seal the injector orifices 16 so as to retain the oxidant 26 in the forward portion of the rocket until the forward motion of the fuel tank 24 and rocket motor 14 produce the required pressure to burst the diaphragms.

It should be understood, of course, that the foregoing disclosure relates to only a preferred embodiment of the invention and that numerous modifications or alterations may be made therein without departing from the spirit and scope of the invention as set forth in the appended claims.

Having thus described the invention, what is claimed is:

1. A rocket comprising a cylindrical body; a perforated partition longitudinally movable therein and defining the injector end of an expansible combustion chamber; an exhaust nozzle at the aft end of said cylindrical body; a solid propellant secured to the partition and discharging rearwardly into the combustion chamber; and a liquid propellent chamber disposed forwardly of the partition and discharging through the perforations into the combustion chamber.

2. A rocket comprising a cylindrical body; an apertured partition longitudinally movable therein and defining the injector end of an expansible combustion chamber; an exhaust nozzle at the aft end of said cylindrical body; a solid propellant rocket motor secured to the partition and discharging rearwardly through the aperture thereof into the combustion chamber, and forwardly movable therewith; and a liquid propellent chamber disposed forwardly of the rocket motor and having a discharge outlet terminating at said aperture.

3. A rocket comprising a cylindrical body; an apertured partition longitudinally movable therein and defining the injector end of an expansible combustion chamber; an exhaust nozzle at the aft end of the cylindrical body; a solid propellant rocket motor secured to the partition, discharging rearwardly through the aperture thereof into the combustion chamber, and forwardly movable therewith; said rocket motor including a solid propellant and means for igniting the propellant; a liquid propellent chamber disposed forwardly of the rocket motor and having a discharge outlet terminating at said aperture; a rupturable bag containing a liquid propellant located in said propellent chamber; and a war-head secured to the cylindrical body forward of the liquid propellent chamber.

4. A rocket comprising a cylindrical body; an apertured partition having orifices opening at the aperture, and longitudinally movable within the body, thereby defining the injector end of an expansible combustion chamber; an exhaust nozzle at the aft end of the cylindrical body; a solid propellant rocket motor secured to the partition to discharge rearwardly through the aperture thereof and forwardly movable therewith; said rocket motor including a solid propellant and means for igniting the propellant; a liquid propellent chamber disposed forwardly of the rocket motor and discharging through the partition orifices into the aperture; burst diaphragms which seal the partition orifices and break when the partition and rocket motor move forward; a propellant contained in said propellent chamber; and a war-head secured to the cylindrical body forward of the propellent chamber.

5. A rocket comprising a cylindrical body; an apertured partition longitudinally movable therein and defining the injector end of an expansible combustion chamber; an exhaust nozzle at the aft end of the cylindrical body; a solid propellant rocket motor secured to the partition, having at least one closed end portion, discharging rearwardly through the aperture thereof into the combustion chamber, and forwardly movable therewith; a movable fuel tank in said body, the end portion of said rocket motor forming one wall of said fuel tank, said end portion being movable into said tank to decrease the volume thereof, and means for discharging the contents of said fuel tank at said aperture; and an oxidant chamber disposed forwardly of said tank and having a discharge outlet terminating at said aperture.

6. A rocket comprising a cylindrical body; an apertured partition longitudinally movable therein and defining the injector end of an expansible combustion chamber; an exhaust nozzle at the aft end of the cylindrical body; a solid propellant rocket motor secured to the partition and forwardly movable therewith and discharging rearwardly through the aperture thereof into the combustion chamber; said rocket motor including a solid propellant and means for igniting the propellant and having a closed end portion; a movable fuel tank, one boundary of said tank being formed by the closed end portion of the rocket motor, the closed end portion adapted to be forced into the fuel tank to decrease the volume thereof; a puncturable bag containing a liquid propellant located in said fuel tank; means for rupturing said puncturable bag and for discharging the contents of said bag at said aperture; an oxidant chamber disposed forwardly of said tank and having a discharge outlet terminating at said aperture; a rupturable bag containing liquid oxidant located in said oxidant chamber; and a war-head secured to the cylindrical body forward of the oxidant chamber.

7. A rocket comprising a cylindrical body; an apertured partition having orifices opening at the aperture, and longitudinally movable within the body, thereby defining the injector end of an expansible combustion chamber; an exhaust nozzle at the aft end of the cylindrical body; a solid propellant rocket motor secured to the partition and forwardly movable therewith and discharging rearwardly through the aperture thereof into the combustion chamber; said rocket motor including a solid propellant, means for igniting the propellant and an axially positioned fuel feed tube secured to the forward face of the rocket motor and extending to the aperture of the partition; said fuel feed tube having an opening at its forward end and orifices at its aft end opening into the aperture; a movable fuel tank telescopically related to the forward end of said motor and discharging through the feed tube forward opening and the feed tube orifices, into the aperture; a burst diaphragm which seals the feed tube forward opening and breaks when the rocket motor moves forward; a propellant contained in said fuel tank; an oxidant chamber disposed forwardly of said fuel tank and discharging through the partition orifices into the aperture; burst diaphragms which seal the partition orifices and break when the fuel tank and rocket motor move forward; a liquid oxidant located in said oxidant chamber; and a war-head secured to the cylindrical body forward of the oxidant chamber.

References Cited in the file of this patent
UNITED STATES PATENTS 2,444,957  Skinner _____ July 13, 1948

FOREIGN PATENTS 197,518  Great Britain _____ May 27, 1923
625,104  France _____ Apr. 19, 1927